Oct. 24, 1967     H. SIGG     3,348,645
DOG CLUTCH
Filed Feb. 15, 1966     2 Sheets-Sheet 2
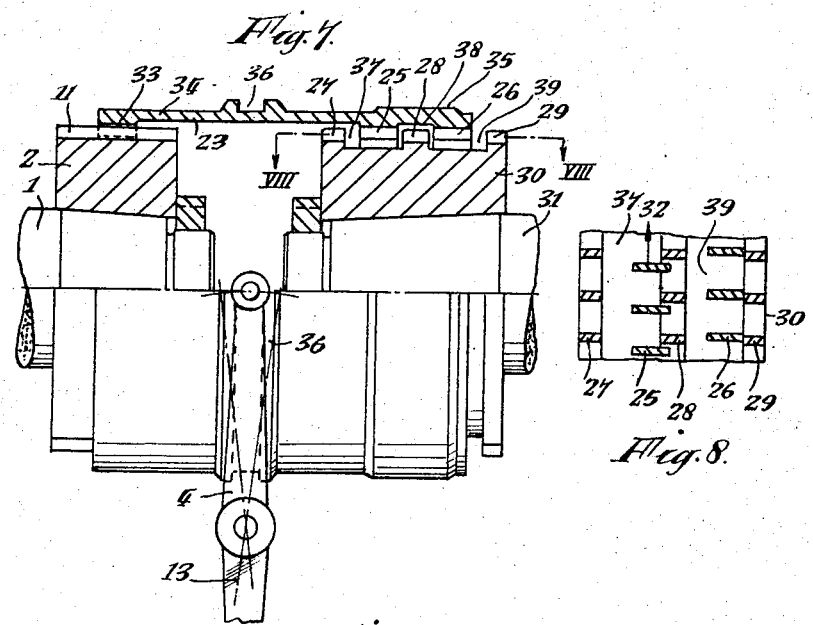
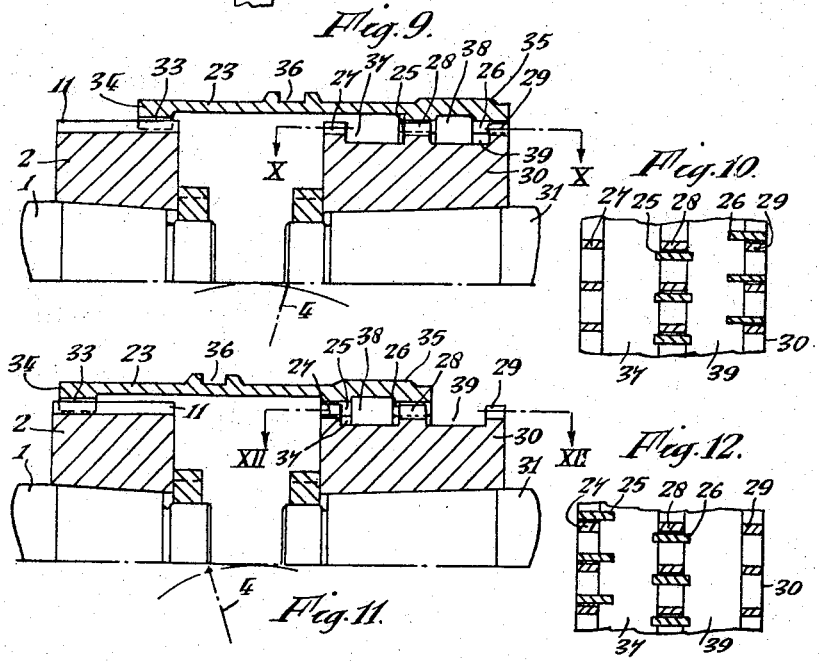

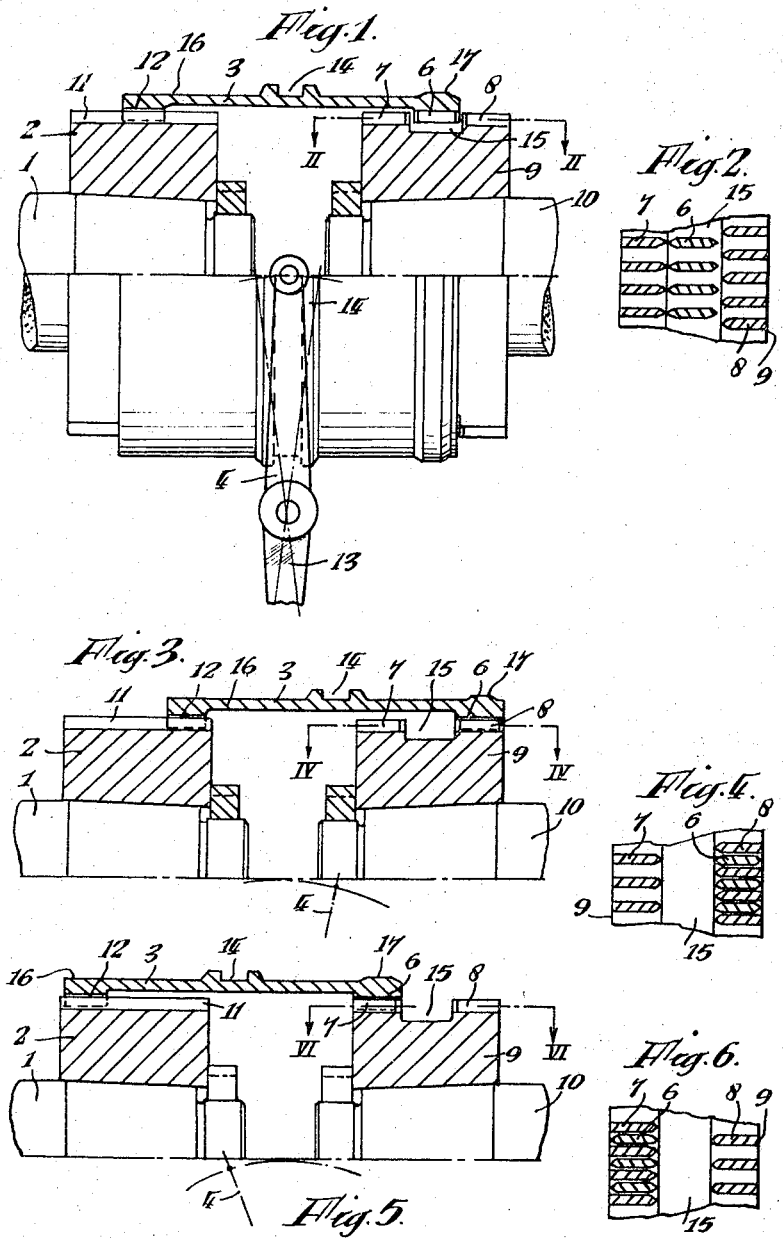

United States Patent Office 3,348,645
Patented Oct. 24, 1967

3,348,645
DOG CLUTCH
Hans Sigg, Widen, Aargau, Switzerland, assignor to Maag Gear Wheel & Machine Company Limited, Zurich, Switzerland, a company of Switzerland
Filed Feb. 15, 1966, Ser. No. 527,536
Claims priority, application Switzerland, Feb. 17, 1965, 2,191/65
5 Claims. (Cl. 192—67)

This invention relates to clutches of the kind in which each of two concentric members which are to be interengaged for a drive to be transmitted therebetween have teeth to effect said interengagement, such clutches being referred to hereinafter, for convenience, as dog clutches.

The object of the present invention is to provide an improved dog clutch.

One known dog clutch in which the two members can be interengaged in any relative position comprises two or more axially offset, concentric toothed ring pairs, one of the pairs comprising dog teeth which are pointed or bevelled at their ends and which normally provide the clutching action, whereas the teeth of the or a second toothed ring pair are axially displaceable relatively to the first such pair and are so staggered peripherally relatively thereto as to be in a ready-to-engage position relatively to one another whenever the first pair cannot engage because the tooth tips thereof are opposite one another, with the result that even assuming complete synchronism between the clutch halves, the clutch can be engaged smoothly in any position. This known dog clutch co-operates with a synchromesh system which is unsuitable for heavy-duty drives.

The problem was to devise, for heavy-duty drives such as high-power marine transmissions, a dog clutch which, although devoid of synchromesh, can be reliably engaged in any realtive position of the two members thereof even though heavy and difficultly movable masses are connected to each of the two members of the clutch. Even though the ends of the teeth which provide the dogs of the two members of the clutch are fined down sharply on both sides to assist satisfactory meshing of the teeth at the initial engagement, it may still happen that, when the drive is stationary, the two members to be clutched to each other are exactly in tooth to tooth alignment and the clutch cannot be engaged.

According to the invention, a clutch comprises two concentric members each having teeth therebetween internally and externally, respectively, disposed in rings on the members for interengagement to enable a drive to be transmitted between the said two members, all of the teeth on both of the said members being located on similar pitch circles about the common axis of the members and having the same pitch and tooth thickness, one of the said members being provided with one more ring of teeth than the other said member, one of the said members being provided with two rings of teeth the teeth of one of the said two rings of teeth being displaced circumferentially relative to the teeth of the other said ring of teeth by a distance equal to one half of the pitch of said teeth, the rings of teeth being so positioned on the two members that the said rings of teeth on the two members alternate along the members when the two members are in the declutched position, the two members being movable axially relative to each other.

The invention is particularly adapted for use with heavy duty drives, for example high power marine engine drives.

In a known dog clutch which has pointed or tapered dogs or teeth to enable the clutch to be engaged when stationary, the displaceable member of the clutch, such member being connected to a shaft by some form of keying, is mounted on the shaft with provision for limited rotation therearound and is retained in a desired position on the shaft by a synchroniser spring, so that should a dog or tooth and a space between dogs or teeth not be exactly opposite one another, the clutch can be engaged without the drive which is connected to the clutch having to be rotated beforehand. This synchroniser spring system cannot be used for heavy-duty drives and is of no use for the purposes of this invention.

Two embodiments of a dog clutch according to the present invention are shown in the accompanying drawings, wherein:

FIG. 1 is an elevation, the upper half being in section, of one embodiment of the invention, the elements being in the declutched or disengaged position;

FIG. 2 is a section taken on the line II—II in FIG. 1;

FIG. 3 is a similar view to the upper half of FIG. 1 but showing the elements in one clutched or engaged position;

FIG. 4 is a section taken on the line IV—IV in FIG. 3;

FIG. 5 is a similar view to the upper half of FIG. 1, but showing the elements in another clutched or engaged position;

FIG. 6 is a section taken on the line VI—VI in FIG. 5;

FIG. 7 is an elevation, the upper half being in section, of a second embodiment of the invention, the elements being shown in the declutched or disengaged position;

FIG. 8 is a section taken on the line VIII—VIII in FIG. 7 but showing a partly clutched or engaged position;

FIG. 9 is a similar view to the upper half of FIG. 7, but showing the elements in one fully clutched or engaged position;

FIG. 10 is a section taken on the line X—X in FIG. 9;

FIG. 11 is a similar view to the upper half of FIG. 7, but showing the elements in another fully clutched or engaged position; and FIG. 12 is a section taken on the line XII—XII in FIG. 11.

The members of the dog clutch according to the invention are engaged and disengaged by axial displacement of one member of the clutch which is formed as an internally toothed sleeve, the other member of the clutch taking the form of a hub having external teeth matching the internal teeth of the sleeve. However, in some cases the externally toothed hub may be axially movable to effect engagement with or disengagement from the internally toothed sleeve.

In the embodiment shown in FIGS. 1–6, an externally toothed hub 2 is secured to the end 1 (FIGS. 1, 3 and 5) of a driving shaft which transmits a drive from some form of drive or input device (not shown). The external teeth 11 on the hub 2 are engaged by internal teeth 12 of the same size with which one axial end 16 of a clutch sleeve 3 is provided, the sleeve 3 being slidable axially on the hub 2. The sleeve 3 can be moved axially by a selector lever 13 having a forked end with arms 4 which engage in a circumferential groove 14 in the sleeve 3. The sleeve 3, which forms one member of the clutch, is provided at its other axial end 17 with a ring of internal teeth 6.

The second member of the dog clutch is provided by a hub 9 which is secured on the end 10 of a shaft which transmits the drive to some device (not shown) which is required to be driven. The hub 9 is provided with two rings of external teeth 7 and 8, which rings are spaced apart axially of the hub to provide therebetween an annular groove 15 in which the internal teeth 6 of the sleeve 3 repose when the members 3 and 9 of the clutch are in the declutched or disengaged position, as shown in FIGS. 1 and 2.

The teeth 6, 7 and 8 are all of the same thickness and have the same pitch on similar pitch circles about the common axis of the sleeve 3 and hub 9. The spacing between adjacent teeth is only slightly larger than the thickness of each tooth, in order that a tooth 6 may slide easily between two adjacent teeth 7 or 8.

However, the external teeth 8 in the ring thereof on the hub 9 are displaced circumferentially relative to the teeth 7 a distance equal to one half of the tooth pitch.

Both axial ends of the teeth 6 are tapered or otherwise thinned to a narrow or fine tip, whilst a similar taper or thinning is given to the inner axial ends of the teeth 7 and 8, that is the ends of the teeth 7 which are directed towards the teeth 8, and vice versa, all as clearly shown in FIG. 2.

When the two shaft ends 1 and 10 are stationary and disconnected from each other, as shown in FIG. 1, they may be connected to each other by operating the lever 13 in either angular direction so as to move the sleeve 3 axially to the right or to the left as seen in FIG. 1. When the stationary positions of the shaft ends 1 and 10 put the teeth 6 in the position shown in FIG. 2, that is with the teeth exactly aligned with the teeth 7, movement of the sleeve 3 to the left will only cause the finely tapered ends of the teeth 6 to abut the finely tapered ends of the teeth 7, and therefore the sleeve 3 cannot be clutched to the hub 9. However, an angular movement of the lever 13 to move the sleeve 3 to the right will cause the teeth 6 to enter between the teeth 8, as shown in FIGS. 3 and 4, and thus clutch the sleeve 3 to the hub 9 and consequently connect the driving shaft 1 to the driven shaft 10.

If, when the shafts 1 and 10 are stationary, the teeth 6 are left exactly aligned with the teeth 8, then an operation of the lever 13 to move the sleeve 3 to the left will cause the teeth 6 to enter between the teeth 7, as shown in FIGS. 5 and 6.

However, if the teeth 6 are not exactly aligned with either the teeth 7 or the teeth 8, then movement of the sleeve 3 to the right or to the left will cause the teeth 6 to enter between either the teeth 7 or the teeth 8, the tapering of the adjacent ends of the teeth 6 and of the teeth 7 or 8 enabling the teeth to slide between each other with, possibly, a slight relative rotation between the sleeve 3 and the hub 9.

It will be seen, therefore, that the shafts 1 and 10 can be connected to each other by moving the sleeve 3 to the right or to the left, or, if such movement in one of the said directions is impeded by endwise abutment of the teeth 6 with either the teeth 7 or the teeth 8 then the sleeve 3 can at once be moved in the opposite direction to effect such connection.

The embodiment of the invention which is shown in FIGS. 7 to 12 will enable the two members of the dog clutch to be clutched to each other when the construction is such that it is difficult to cause the said members to rotate relatively to each other merely by causing the members to move axially relatively to each other and the dog teeth to slide between each other.

In FIG. 7, the driving shaft end 1 is provided with a hub 2 which is secured thereto, and the hub 2 is provided with a ring of external teeth 11 which are engaged by a ring of internal teeth 33 in one axial end 34 of a sleeve 23.

The driven shaft end 31 is provided with a hub 30 which is secured thereto, and the said hub 30 is surrounded by the other axial end 35 of the sleeve 23. The sleeve 23 is movable axially in relation to the hubs 2 and 30 by a lever 13 which has a forked end of which the arms 4 engage in a circumferential groove 36 in the sleeve.

The said other axial end 35 of the sleeve 3 is provided internally with two rings of internal teeth 25 and 26, whilst the hub 30 is provided with three rings of external teeth 27, 28 and 29. All of the rings of teeth 25–29 have the same pitch circle about the common axis of the sleeve 3 and the shaft end 31, they all have the same pitch, and they all have the same thickness. Furthermore, all of the said teeth have blunt ends, that is ends which are not tapered; in the example shown, as seen in FIGS. 8, 10 and 12, the ends of the teeth are square.

The rings of teeth 25–29 are so positioned that when the sleeve 23 is in the position disengaging the shafts 1 and 31 from each other, as shown in FIG. 7, the ring of teeth 25 lies in a groove 37 between the rings of teeth 27 and 28, the ring of teeth 28 lies in a groove 38 between the rings of teeth 25 and 26, and the ring of teeth 26 lies in a groove 39 between the rings of teeth 28 and 29. However, in the medial position of the sleeve end 35 relative to the hub 30, as seen in FIG. 1, the teeth 25 and 26 are closer to the teeth 28 than they are to the teeth 27 and 29, respectively. Thereby, when, for example, the sleeve 23 is moved axially to the right, in FIG. 7, the right-hand ends of the teeth 25 will have moved between the teeth 28 by the time that the right-hand ends of the teeth 26 move up to the left-hand ends of the teeth 29, as can be seen in FIG. 8; the opposite condition, with the teeth 26 moving between the teeth 28 before the teeth 25 reach the teeth 27, applies when the sleeve 23 is moved to the left. The teeth 25 and 26 may be wider than the teeth 27, 28 and 29.

Furthermore, the thickness of each tooth is one quarter of the pitch; that is, compared with a normal gear teeth arrangement when the pitch is twice the tooth thickness on the pitch circle, every other tooth is omitted so as to leave spaces between adjacent teeth which are three times the tooth thickness.

Whilst the teeth 27, 28 and 29 on the hub 30 are all in alignment with each other in an axial direction, the teeth 26 in the sleeve 23 are displaced relatively to the teeth 25, circumferentially of the sleeve, a distance equal to one-half of the pitch, that is, twice the tooth thickness. These relative relationships of the teeth are seen in FIG. 8.

In order to connect the shafts 1 and 31 to each other, the lever 13 is operated to move the sleeve 23 either to the right or to the left. If the sleeve 23 is moved to the right, even though the relative angular positions of the sleeve and of the hub 30 may be such that the ends of the teeth 26 will abut the ends of the teeth 29 and thus prevent further axial movement of the sleeve to the right, the teeth 25 will already have entered between the teeth 28, as is clearly seen in FIG. 8. Then, if the drive to the shaft 1 is started up gently so as to rotate the sleeve 23 in the direction indicated by the arrow 32 in FIG. 8, the teeth 25 and 26 will rotate in that same direction until the flanks of the teeth 25 and 28 abut each other, and the teeth 26 move out of abutment with the teeth 29, whereupon the sleeve 23 can be moved further to the right for the teeth 25 and 26 to move fully between the teeth 28 and 29, respectively, as shown in FIGS. 9 and 10, and thus complete the clutching operation.

If, upon moving the sleeve 23 to the right from the position shown in FIG. 1, the adjacent ends of the teeth 25 and 28 abut each other so as to prevent any further such movement, then the lever 13 is reversed to move the sleeve 23 to the left and so finally achieve the positions shown in FIGS. 11 and 12, the intermediate positions being the reverse of those described with reference to the movement of the sleeve to the right.

What I claim and desire to secure by Letters Patent is:

1. A clutch comprising two concentric members each having teeth therebetween internally and externally, respectively, disposed on rings on the members for interengagement to enable a drive to be transmitted between the said two members, all of the teeth on both of the said members being located on similar pitch circles about the common axis of the members and having the same pitch and tooth thickness, one of the said members being provided with one more ring of teeth than the other said member and including at least two rings of teeth, the teeth of one of the said two rings of teeth being displaced circumferentially relative to the teeth of the other said ring of teeth by a distance equal to one-half of the pitch of said teeth, the rings of teeth being so positioned on the two members that the said rings of teeth on the two members alternate in an axial direction along the members when the two members are in the declutched position, the two members being movable axially relative to each other to engage one of said rings of teeth on said one member with a ring of teeth on said other member.

2. A clutch according to claim 1, wherein the other one of the said members is provided with only one ring of teeth, and the pitch of the teeth on each of the two members is substantially twice the thickness of the teeth.

3. A clutch according to claim 1, wherein said one of the said members is provided with three rings of teeth, and the pitch of the teeth on each of the two members is substantially four times the thickness of the teeth.

4. A clutch according to claim 3, wherein the positions of the rings of teeth on the two members are such that when the two members are in the declutched position with the medial ring of teeth on the member which has three rings of teeth disposed medially of the two rings of teeth on the other member, the spacing of both ends of the teeth in the said medial ring of teeth from the adjacent and inner ends of the teeth in the said two rings of teeth on the said other member is less than the spacing of the inner ends of the teeth in the two outer rings of teeth on the member which has three rings of teeth from the adjacent and outer ends of the teeth in the said two rings of teeth on the said other member.

5. A clutch according to claim 1, wherein the teeth in the several rings of teeth are tapered at their ends which are adjacent another ring of teeth when the members are in the declutched position.

References Cited

UNITED STATES PATENTS 2,667,252   1/1954   Meyer _____ 192—108 X

FOREIGN PATENTS 68,971   6/1941   Czechoslovakia.

BENJAMIN W. WYCHE III, *Primary Examiner.*